(12) United States Patent
Gao

(10) Patent No.: US 6,703,160 B2
(45) Date of Patent: Mar. 9, 2004

(54) BATTERY PACK OR BATTERY PROVIDING INCREASED HEAT DISSIPATION

(75) Inventor: Yuan Gao, Monroe, NJ (US)

(73) Assignee: FMC Corporation, Lithium Division, Philadelphia, PA (US)

( * ) Notice: Subject to any disclaimer, the term of this patent is extended or adjusted under 35 U.S.C. 154(b) by 280 days.

(21) Appl. No.: 09/834,029

(22) Filed: Apr. 12, 2001

(65) Prior Publication Data

US 2001/0049052 A1 Dec. 6, 2001

Related U.S. Application Data

(60) Provisional application No. 60/196,615, filed on Apr. 13, 2000.

(51) Int. Cl.$^7$ .......................... H01M 2/02; H01M 2/10; H01M 10/50
(52) U.S. Cl. .......................... 429/120; 429/99; 429/100; 429/176
(58) Field of Search .......................... 429/99, 100, 120, 429/176, 163, 164

(56) References Cited

U.S. PATENT DOCUMENTS

| | | | |
|---|---|---|---|
| 4,135,040 A | * | 1/1979 | Thornton .................... 429/104 |
| 5,501,918 A | | 3/1996 | Gruenstern et al. |
| 5,576,113 A | | 11/1996 | Hirofumi et al. |
| 5,866,276 A | * | 2/1999 | Ogami et al. ................ 429/120 |
| 5,871,859 A | | 2/1999 | Parise |
| 6,034,871 A | | 3/2000 | Cheng |

FOREIGN PATENT DOCUMENTS

| | | |
|---|---|---|
| JP | 6250554 A2 | 12/1985 |
| JP | 61027057 A2 | 2/1986 |
| JP | 07014616 A | 1/1995 |
| JP | 9161736 A2 | 6/1997 |
| JP | 11025932 A | 1/1999 |
| JP | 11238491 A | 8/1999 |
| JP | 11307064 A2 | 11/1999 |
| JP | 11307078 A2 | 11/1999 |
| JP | 2000-21359 A2 | 1/2000 |
| WO | WO 00/24838 | 5/2000 |
| WO | WO 00/60691 | 10/2000 |
| WO | WO 01/48838 A2 * | 7/2001 |

OTHER PUBLICATIONS

Hatchard et al., *Importance of Heat Transfer by Radiation in Li–Ion Batteries during Thermal Abuse*, Electrochemical and Solid–State Letters, 3 (7) pp. 305–308, (May 16, 2000).

Hatchard et al., *Some aspects of thermal runaway in Li–ion cells*; 17$^{th}$ International Seminar and Exhibit on Primary and Secondary Batteries, Mar. 6–9, 2000.

International Search Report, PCT/US 01/11880, published with WO 01/80333, Oct. 25, 2001.

* cited by examiner

*Primary Examiner*—Randy Gulakowski
*Assistant Examiner*—Jonathan Crepeau
(74) *Attorney, Agent, or Firm*—Myers Bigel Sibley & Sajovec, P.A.

(57) ABSTRACT

The present invention includes a battery pack or battery having excellent heat dissipation thus increasing the safety of these devices in high power applications. The battery packs and batteries of the invention have a surface with a high true surface area such that the surface roughness (R), defined by the ratio of the true surface area of the surface to the apparent surface area of the surface, is greater than or equal to about 1.2. In addition, the battery packs and batteries of the invention are preferably formed of material having a high emissivity or include high emissivity labels to provide even greater heat dissipation.

40 Claims, 3 Drawing Sheets

BATTERY PACK OR BATTERY PROVIDING INCREASED HEAT DISSIPATION

CROSS-REFERENCE TO RELATED APPLICATIONS

This application is related to commonly owned now abandoned provisional application Ser. No. 60/196,615, filed Apr. 13, 2000, and claims the benefit of the earlier filing date of this application under 35 U.S.C. §119(e).

FIELD OF THE INVENTION

The present invention relates to battery packs and batteries that provide increased heat dissipation and particularly relates to lithium-ion battery packs and batteries having a high true surface area to provide increased heat dissipation.

BACKGROUND OF THE INVENTION

Lithium-ion batteries have found increased use in high power applications such as in automobiles and other vehicles. In these applications, several lithium-ion batteries are typically provided in series and/or in parallel within a battery pack to provide the desired amount of power.

One major problem with the use of lithium-ion batteries in these high power applications is that the batteries within the battery packs can become hot when the batteries are charged or discharged at high rates or when the batteries are short-circuited. If this heat is not properly transferred from the battery pack, the heat accumulates within the battery pack causing "thermal runaway" within the batteries. "Thermal runaway" can be characterized by an uncontrolled rise in temperature that leads to serious safety hazards such as fire or even explosion risks. Because of the importance of safety in these high power applications, there is a need to prevent "thermal runaway" in lithium-ion batteries.

SUMMARY OF THE INVENTION

The present invention is directed to a battery pack or battery that provides excellent heat dissipation, especially compared to conventional battery packs or batteries, thus increasing the safety of these devices in high power applications. In addition, the present invention provides an inexpensive method of increasing the heat dissipation of battery packs and batteries.

In accordance with the invention, the smooth surfaces of conventional battery packs and batteries are replaced with surfaces having high true surface areas. Specifically, the present invention is directed to a battery pack and/or a battery having a surface with a high true surface area such that the surface roughness (R), defined by the ratio of the true surface area of the surface to the apparent surface area of the surface, is greater than or equal to about 1.2. The present invention is particularly useful for battery packs and batteries that have the tendency to experience heat accumulation such as lithium-ion battery packs and batteries.

According to one embodiment of the invention, the present invention includes a battery pack for holding a plurality of batteries, the battery pack having a surface with a high true surface area, wherein the surface roughness (R), defined by the ratio of the true surface area of the surface to the apparent surface area of the surface, is greater than or equal to about 1.2. Preferably, R is greater than or equal to about 1.5, and more preferably, greater than or equal to 2.0. The surface of the battery pack having a high true surface area can be the outer surface, the inner surface, or both. The surface can be a rough surface or can include a plurality of indentations or raised areas to produce the desired values for R. Preferably, the surface has a scale of surface roughness of less than or equal to about 0.5 mm. In addition to increasing the heat dissipation by increasing R for the surface, the surface can be formed of a material having a high emissivity to provide increased heat dissipation. Preferably, the battery pack is formed of material having an emissivity of greater than about 0.70, more preferably greater than about 0.85. The outer surface of the battery pack can also include a label, preferably a heat dissipative label, e.g., a label having an outer surface with a high true surface area or a label having an emissivity of greater than about 0.70, preferably greater than 0.85. The battery packs of the invention can include a plurality of batteries, such as lithium-ion batteries.

According to another embodiment of the invention, the present invention includes a battery, preferably a lithium-ion battery, having a high true surface area such that the surface roughness (R), defined by the ratio of the true surface area of the outer surface to the apparent surface area of the outer surface, is greater than or equal to about 1.2. Preferably, R is greater than or equal to 1.5, and more preferably greater than or equal to 2.0. In addition, the outer surface preferably has a scale of surface roughness of less than or equal to about 0.5 mm. The outer surface can be rough or can include a plurality of indentations or raised areas to produce the desired values for R. Moreover, the outer surface of the battery can be formed of a material having a high emissivity to provide increased heat dissipation, e.g., having an emissivity of greater than about 0.70, more preferably greater than about 0.85. In addition, the outer surface of the battery can include a label, preferably a heat dissipative label, e.g., a label having an outer surface with a high true surface area or a label having an emissivity of greater than about 0.70, preferably greater than 0.85. The batteries of the invention can also be provided in the heat dissipative battery packs of the invention described above.

These and other features and advantages of the present invention will become more readily apparent to those skilled in the art upon consideration of the following detailed description and accompanying drawings, which describe both the preferred and alternative embodiments of the present invention.

DETAILED DESCRIPTION OF THE PREFERRED EMBODIMENTS

Figure 1:
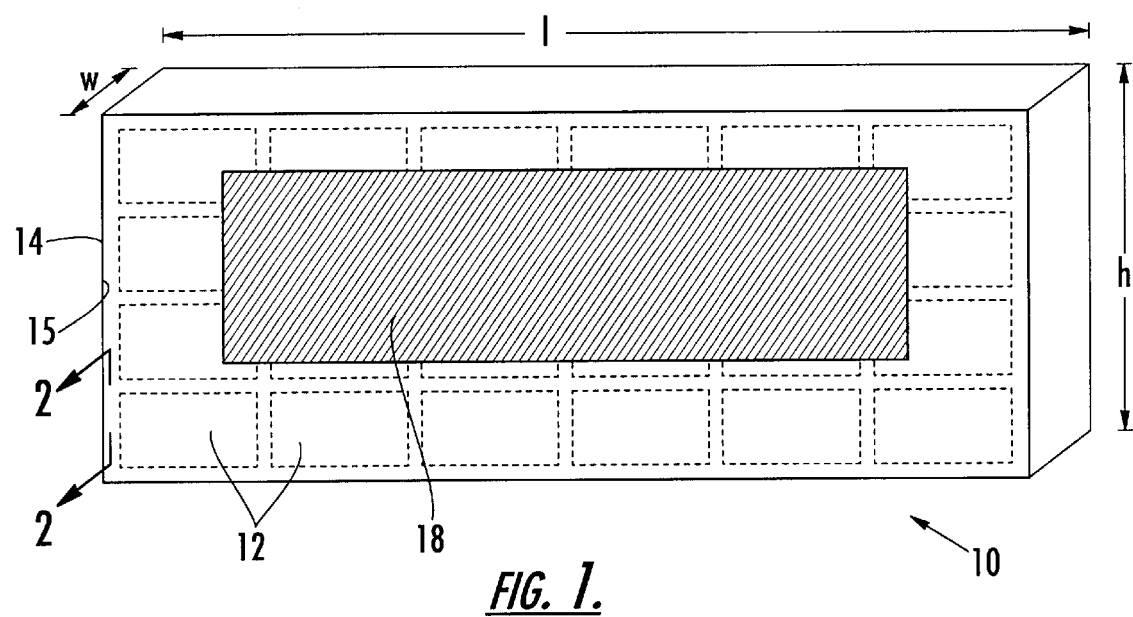
FIG. 1 is a front view of a battery pack having a high true surface area in accordance with the invention and comprising a plurality of batteries.

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings. In the drawings, like numbers refer to like elements throughout.

FIG. 1 illustrates a battery pack 10 in accordance with the present invention. The battery pack 10 illustrated in FIG. 1 includes a plurality of batteries 12 shown in phantom such as lithium-ion batteries. Although FIG. 1 illustrates a plurality of cylindrical batteries 12, batteries having other shapes can also be used in accordance with the invention. In addition, the battery pack 10 can be other than the rectangular construction illustrated in FIG. 1.

The battery pack 10 has a surface with a high true surface area such that the surface roughness (R) of the outer surface is greater than or equal to about 1.2. Preferably, R is greater than or equal to about 1.5 and more preferably, greater than or equal to 2.0. The surface roughness is defined as the ratio of the true surface area of the surface to the apparent surface area of the surface. In the battery pack 10, the outer surface 14, the inner surface 15, or both, can have the desired surface roughness. Preferably, both the outer surface 14 and the inner surface 15 have the desired surface roughness to provide increased heat dissipation.

As would be readily understood by those skilled in the art, the true surface area of the outer surface 14 can be measured by several known methods such as the Brunauer, Emmett, Teller (BET) process, atomic force microscopy (AFM), or by using a surface profile probe. The apparent surface area, on the other hand, is determined solely by the dimensions of the object. For example, the apparent surface area for a rectangular object (or a prismatic object) having a length (l), a width (w) and a height (h) is 2wl+2wh+2lh. The apparent surface area for a cylindrical object having a diameter (D) and a length (l), on the other hand, is $2\pi(D/2)^2+\pi lD$. Because the battery pack 10 does not have exact dimensions due to the surface roughness of the outer surface 14 and the inner surface 15, average dimensions can be used to determine the apparent surface area for these surfaces.

Figure 2A:
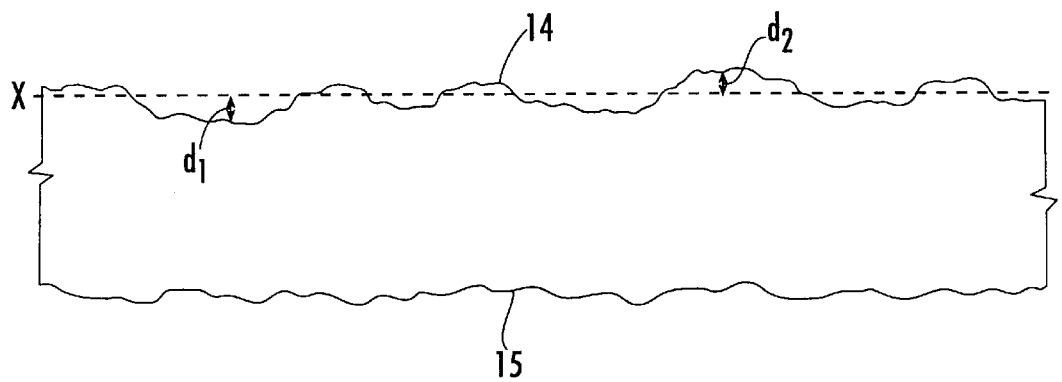
FIG. 2A is a cross-sectional view of a section of the outer and inner surfaces of the battery pack of FIG. 1 taken along line 2—2, wherein the outer and inner surfaces are rough to produce a high true surface area.

FIG. 2A illustrates one embodiment of the invention wherein the outer surface 14 and the inner surface 15 of the battery pack 10 are rough surfaces to provide the desired high true surface area and thus the desired surface roughness. As would be understood by those skilled in the art, the rough outer surface 14 can be produced by various methods such as molding the battery pack 10 to have a rough outer surface, rubbing the outer surface with an abrasive and applying an abrasive coating to the outer surface. The abrasive coating applied to the outer surface 14 can be an abrasive paint and is preferably a dark colored paint (e.g. black) that has good emissivity when applied to the outer surface 14. Preferably, the rough outer surface 14 is produced by molding the battery pack 10 to have a rough outer surface. As would be understood by those skilled in the art, the rough inner surface 15 can also be produced by various methods and is preferably formed by molding the battery pack 10 to have a rough inner surface.

The surface or surfaces of the battery pack 10 having a high true surface area preferably have a scale of the surface roughness of less than or equal to about 0.5 mm, more preferably, less than or equal to about 0.2 mm and even less than or equal to about 0.1 mm. The scale of the surface roughness is defined as the average change of the local surface profile. In particular, as shown with respect to the outer surface 14 in FIG. 2A, the local surface profile can be defined by an average dimension x and the average change of the local surface profile (i.e., the scale of the surface roughness) determined by averaging the distances (e.g., $d_1$, $d_2$, etc.) from the average dimension. In other words, the scale of the surface roughness ($\bar{d}$) over an area defined by dimensions x and y can be represented by the following formula:

$$\bar{d} = \frac{\int d(x, y) dx dy}{\int dx dy}$$

Figure 2B:
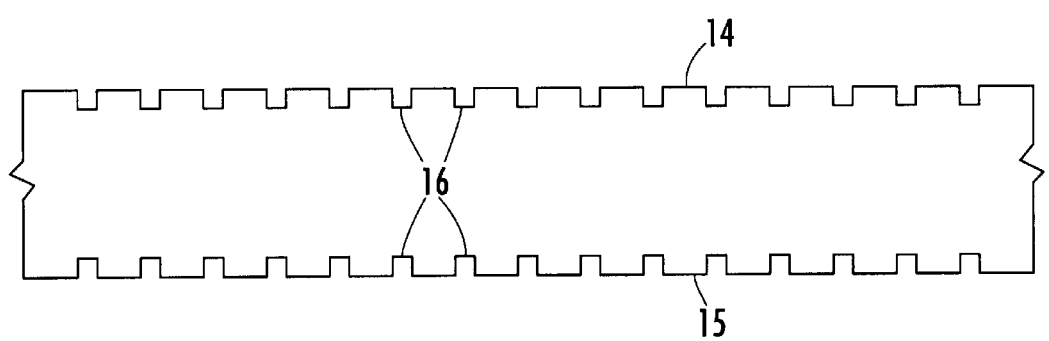
FIG. 2B is a cross-sectional view of a section of the outer and inner surfaces of the battery pack of FIG. 1 taken along line 2—2, wherein the outer and inner surfaces include a plurality of grooves to produce a high true surface area.
Figure 2C:
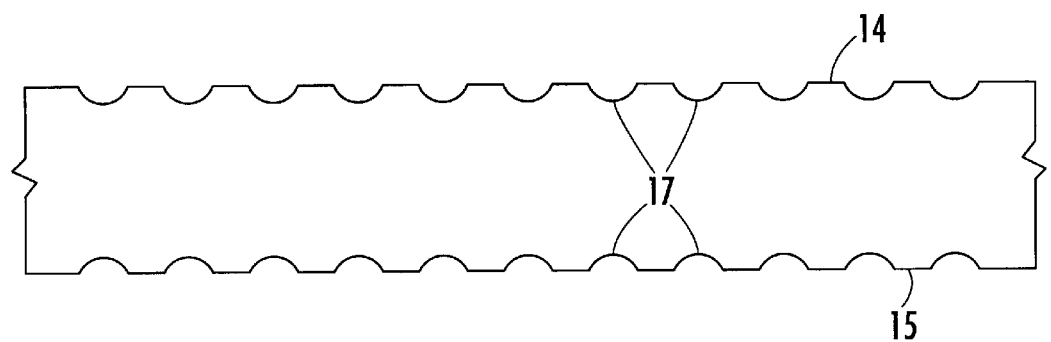
FIG. 2C is a cross-sectional view of a section of the outer and inner surfaces of the battery pack of FIG. 1 taken along line 2—2, wherein the outer and inner surfaces include a plurality of dimples to produce a high true surface area.

FIGS. 2B and 2C illustrate alternative embodiments of the invention wherein the outer surface 14 and/or the inner surface 15 include a plurality of indentations or raised areas to provide the desired high true surface area. In particular, FIG. 2B illustrates a plurality of grooves 16 in the outer surface 14 and the inner surface 15 and FIG. 2C illustrates a plurality of dimples 17 in the outer surface and the inner surface of the battery pack 10. The indentations or raised areas in the outer surface 15 and the inner surface 14 are preferably formed by molding the battery pack 10 to include the indentations or raised areas. However, one skilled in the art may recognize other methods of producing the indentations or raised areas in the battery pack 10, particularly on the outer surface 14. As with the embodiment illustrated in FIG. 2A, the surface or surfaces having a high true surface area preferably have a scale of the surface roughness of less than or equal to about 0.5 mm, more preferably, less than or equal to about 0.2 mm and even less than or equal to about 0.1 mm. For example, the scale of the surface roughness is preferably greater than or equal to 0.001 mm and less than or equal to 0.5 mm, more preferably greater than or equal to 0.005 mm and less than or equal to 0.5 mm, even more preferably greater than or equal to 0.01 mm and less than or equal to 0.2 mm, and even greater than or equal to 0.01 mm and less than or equal to 0.1 mm. In addition to grooves and dimples, other indentations or raised areas can be formed in the outer surface to provide the desired true surface area such as imprinted or raised lettering.

In addition to increasing the heat dissipation by increasing R for the outer surface 14 and/or the inner surface 15, the battery pack 10 is preferably formed of a material having a high emissivity to provide increased heat dissipation. Preferably, the battery pack 10 is formed of material having an emissivity of greater than about 0.70, more preferably greater than about 0.85. For example, the battery pack 10 can be formed of a strong, dark-colored (e.g. black) plastic material such as a polycarbonate.

As shown in FIG. 1, the outer surface 14 of the battery pack 10 can also include a label 18, preferably a heat dissipative label, that is typically attached to the outer surface 14 of the battery pack 10 by an adhesive layer. The label 18 can have an emissivity of greater than about 0.70, and more preferably greater than about 0.85 to provide increased heat dissipation. For example, the high dissipative label 18 can be formed of a plastic material such as polyester or polyvinyl chloride, preferably having a dark color, to provide the desired emissivity. The outer surface of the label 18 can also have a high true surface area to produce increased heat dissipation, such that its surface roughness is greater than or equal to about 1.2, preferably greater than or equal to about 1.5, and more preferably greater than or equal to about 2.0. For example, an abrasive coating can be applied to the label 18 or indentations or raised areas included in the outer surface of the label to produce the desired surface roughness.

Figure 3A:
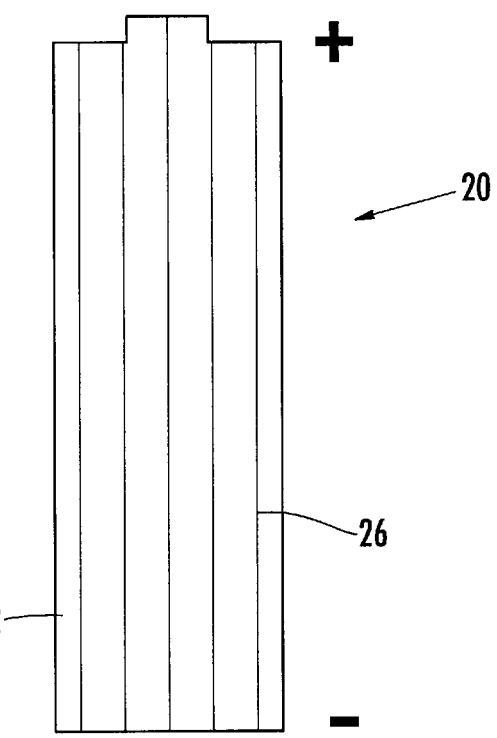
FIG. 3A is a side elevation view of a cylindrical battery having an outer surface with a high true surface area in accordance with the invention.

As illustrated in FIG. 3A, the present invention also includes a battery 20 having a high true surface area such that the surface roughness, i.e., the ratio (R) of the true surface area of the outer surface 22 of the battery to the apparent surface area of the outer surface, is greater than or equal to about 1.2, preferably greater than or equal to 1.5, and more preferably greater than or equal to 2.0.

The battery 20 is typically a unicell that includes a positive electrode, a negative electrode, an electrolyte, and an insulating separator that separates the positive and negative electrodes, encased within a stainless steel or aluminum battery casing. Preferably, the battery 20 is a lithium-ion battery.

In the case of a lithium-ion battery, the positive electrode is typically formed of an active material that is typically combined with a carbonaceous material and a binder polymer. Preferably, the active material is a doped lithium metal oxide or metal oxide intercalation compound such as described in U.S. patent application Ser. No. 08/954,372, filed Oct. 20, 1997 now abandoned. The negative electrode can be formed of lithium metal, lithium metal alloys, or any material capable of reversibly lithiating and delithiating at an electrochemical potential relative to lithium metal between about 0.0 V and 0.7 V. Examples of negative electrode materials are carbonaceous materials including carbonaceous materials containing H, B, Si, Sn, tin oxides, tin-silicon oxides or tin alloys. The electrolyte can be a non-aqueous liquid, gel or solid and preferably comprises a lithium salt.

The outer surface 22 of the battery 20 can be rough to produce the desired high true surface area and the rough outer surface can be formed using any of the methods described above. Preferably, the outer surface 22 includes a plurality of indentations or raised areas to provide the desired high true surface area, e.g., a plurality of grooves 26 as illustrated in FIG. 3. The indentations or raised areas can be formed in the stainless steel or aluminum outer surface 22 of the battery 20 by cutting indentations into the battery casing or by molding the battery casing to include indentations or raised areas. In addition, other methods recognized in the art to increase the true surface area of the outer surface 22 can be used in accordance with the invention. The outer surface 22 preferably has a scale of the surface roughness of less that or equal to about 0.5 mm, more preferably, less than or equal to about 0.2 mm and even less than or equal to about 0.1 mm. For example, the scale of the surface roughness is preferably greater than or equal to 0.001 mm and less than or equal to 0.5 mm, more preferably greater than or equal to 0.005 mm and less than or equal to 0.5 mm, even more preferably greater than or equal to 0.01 mm and less than or equal to 0.2 mm, and even greater than or equal to 0.01 mm and less than or equal to 0.1 mm.

In addition to providing an outer surface 22 having a high true surface area, the outer surface 22 of the battery 20 can also be formed of a material having a high emissivity. For example, a material having an emissivity of greater than about 0.70, more preferably greater than about 0.85, can be used to provide increased heat dissipation.

Figure 3B:
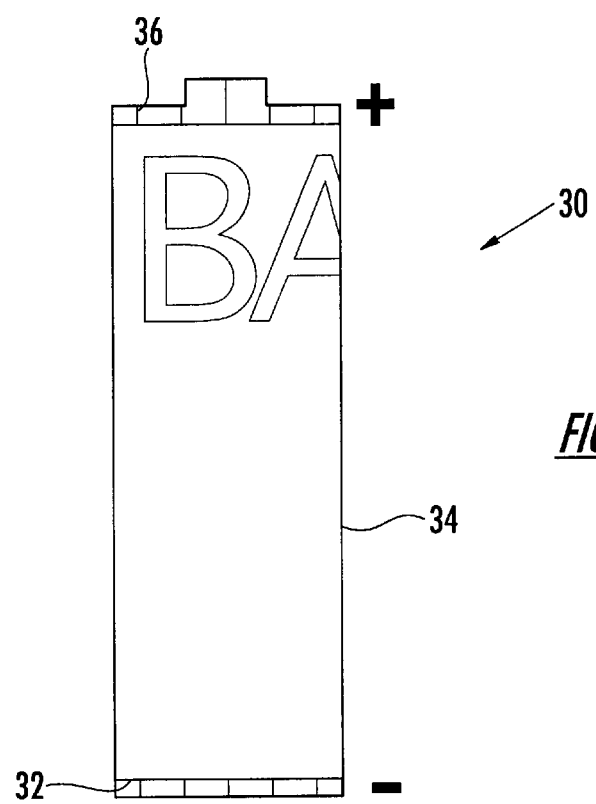
FIG. 3B is a side elevation view of a cylindrical battery having an outer surface that includes a heat dissipative label wherein the outer surface has a high true surface area in accordance with the invention.

As shown in FIG. 3B, a battery 30 in accordance with the invention can also include a label 34, preferably a heat dissipative label, on the outer surface 32 of the battery 30. For example, the label 34 can have an emissivity of greater than about 0.70, and more preferably greater than about 0.85, to provide increased heat dissipation. Alternatively, the label 34 can have a high true surface area to provide increased heat dissipation such that its surface roughness is greater than or equal to about 1.2, preferably greater than or equal to about 1.5, and more preferably, greater than or equal to about 2.0. Preferably, the heat dissipative label 34 covers a substantial portion of the outer surface 32 of the battery 30, e.g., greater than about 50%, more preferably greater than about 75% of the outer surface 32. The heat dissipative label 34 can be formed of a plastic material such as polyester or polyvinyl chloride, preferably having a dark color, and is typically attached to the battery 30 by an adhesive layer. In addition to the heat dissipative label 34, the outer surface 32 of the battery 30 can have a high true surface area, e.g., through the use of grooves 36 illustrated in FIG. 3B. Furthermore, the battery 30 can include an inner surface having a surface roughness and a scale of the surface roughness within the ranges described above for the outer surface 32.

It has been discovered that increasing the true surface area of the surfaces of battery packs and batteries in accordance with the invention such that the surface roughness is greater or equal to about 1.2 increases the heat transfer from the outer surface of the battery pack or battery. As a result, there is less heat accumulation within the battery pack or battery thereby preventing thermal runaway and the negative effects resulting therefrom. In particular, the increased surface roughness of the battery packs and batteries of the invention enhances not only thermal radiation but also thermal conduction and convection to provide the desired level of heat dissipation. As such, the battery packs and batteries of the invention can be used in large power applications such as for electric or hybrid vehicles.

It is understood that upon reading the above description of the present invention and reviewing the accompanying drawings, one skilled in the art could make changes and variations therefrom. These changes and variations are included in the spirit and scope of the following appended claims.

That which is claimed:

1. A battery pack for holding a plurality of batteries, said battery pack having a surface with a high true surface area wherein the surface roughness (R), defined by the ratio of the true surface area of the surface to the apparent surface area of the surface, is greater than or equal to about 2.0.

2. The battery pack according to claim 1, wherein the surface has a scale of surface roughness of less than or equal to about 0.5 mm.

3. The battery pack according to claim 1, wherein the surface has a scale of surface roughness of greater than or equal to about 0.001 mm and less than or equal to about 0.5 mm.

4. The battery pack according to claim 1, wherein the surface has a scale of surface roughness of greater than or equal to about 0.005 mm and less than or equal to about 0.5 mm.

5. The battery pack according to claim 1, wherein the surface has a scale of surface roughness of greater than or equal to about 0.01 mm and less than or equal to about 0.2 mm.

6. The battery pack according to claim 1, wherein the surface is an inner surface of the battery pack.

7. The battery pack according to claim 1, wherein the surface is an outer surface of the battery pack.

8. The battery pack according to claim 1, wherein the surface of the battery pack is rough to produce a high true surface area.

9. The battery pack according to claim 8, wherein the surface is molded such that it has a rough surface.

10. The battery pack according to claim 8, wherein the surface is an outer surface of the battery pack, and the outer surface is painted with an abrasive coating composition to produce the rough surface.

11. The battery pack according to claim 8, wherein the surface is an outer surface of the battery pack, and the outer surface is rubbed with an abrasive to produce the rough surface.

12. The battery pack according to claim 1, wherein the surface of the battery pack includes a plurality of indentations or raised areas that produce a high true surface area.

13. The battery pack according to claim 12, wherein the indentations include grooves.

14. The battery pack according to claim 12, wherein the indentations include dimples.

15. The battery pack according to claim 1, wherein the surface of the battery pack is formed of material having a high emissivity.

16. The battery pack according to claim 15, wherein the surface of the battery pack is formed of material having an emissivity of greater than about 0.70.

17. The battery pack according to claim 15, wherein the surface of the battery pack is formed of material having an emissivity of greater than about 0.85.

18. The battery pack according to claim 1, wherein the surface is an outer surface of the battery pack, and the outer surface includes a heat dissipative label.

19. The battery pack according to claim 18, wherein the label has an emissivity of greater than about 0.70.

20. The battery pack according to claim 18, wherein the label has an emissivity of greater than about 0.85.

21. The battery pack according to claim 18, wherein the label has a label outer surface with a high true surface area wherein the surface roughness (R), defined by the ratio of the true surface area of the label outer surface to the apparent surface area of the label outer surface, is greater than or equal to about 1.2.

22. The battery pack according to claim 1, comprising a plurality of lithium-ion batteries.

23. The battery pack according to claim 1, comprising a plurality of batteries, wherein at least a portion of the batteries in said plurality of batteries has an outer surface with a high true surface area wherein the surface roughness (R), defined by the ratio of the true surface area to the apparent surface area, is greater than or equal to about 2.0.

24. A battery having an outer surface with a high true surface area wherein the surface roughness (R), defined by the ratio of the true surface area of the outer surface to the apparent surface area of the outer surface, is greater than or equal to about 2.0.

25. The battery according to claim 24, wherein the outer surface has a scale of surface roughness of 0.5 mm or less.

26. The battery according to claim 24, wherein the outer surface has a scale of surface roughness of greater than or equal to about 0.001 mm and less than or equal to about 0.5 mm.

27. The battery according to claim 24, wherein the outer surface has a scale of surface roughness of greater than or equal to about 0.005 mm and less than or equal to about 0.5 mm.

28. The battery according to claim 24, wherein the outer surface has a scale of surface roughness of greater than or equal to about 0.01 mm and less than or equal to about 0.2 mm.

29. The battery according to claim 24, wherein the outer surface of the battery includes a plurality of indentations or raised areas that produce a high true surface area.

30. The battery according to claim 29, wherein the indentations include grooves.

31. The battery according to claim 29, wherein the indentations include dimples.

32. The battery according to claim 24, wherein the outer surface of the battery is rough to produce a high true surface area.

33. The battery according to claim 24, wherein the outer surface of the battery is formed of material having an emissivity of greater than about 0.70.

34. The battery according to claim 24, wherein the outer surface of the battery includes a heat dissipative label.

35. The battery according to claim 34, wherein the label has an emissivity of greater than about 0.70.

36. The battery according to claim 34, wherein the label has an emissivity of greater than about 0.85.

37. The battery according to claim 34, wherein the label has a outer surface with a high true surface area wherein the surface roughness (R), defined by the ratio of the true surface area of the label outer surface to the apparent surface area of the label outer surface, is greater than or equal to about 1.2.

38. The battery according to claim 37, wherein the label outer surface has a surface roughness of greater than or equal to about 1.5.

39. The battery according to claim 37, wherein the outer surface of the label has a surface roughness of greater than or equal to about 2.0.

40. The battery according to claim 24, further comprising an inner surface with a high true surface area wherein the surface roughness (R), defined by the ratio of the true surface area of the inner surface to the apparent surface area of the inner surface, is greater than or equal to about 1.2.

* * * * *

UNITED STATES PATENT AND TRADEMARK OFFICE
CERTIFICATE OF CORRECTION

PATENT NO. : 6,703,160 B2
DATED : March 9, 2004
INVENTOR(S) : Gao

It is certified that error appears in the above-identified patent and that said Letters Patent is hereby corrected as shown below:

Column 8,
Line 37, should read -- has a label outer surface with a high true surface area wherein the --

Signed and Sealed this

Twenty-ninth Day of June, 2004

JON W. DUDAS
*Acting Director of the United States Patent and Trademark Office*